United States Patent
Chan et al.

(10) Patent No.: US 9,236,740 B2
(45) Date of Patent: *Jan. 12, 2016

(54) METHOD AND APPARATUS FOR REMOVAL OF HARMONIC NOISE

(71) Applicant: Elwha LLC, Bellevue, WA (US)

(72) Inventors: Alistair K. Chan, Bainbridge Island, WA (US); Geoffrey F. Deane, Bellevue, WA (US); Aaron Fyke, Pasadena, CA (US); William Gross, Pasadena, CA (US); Roderick A. Hyde, Redmond, WA (US); Edward K. Y. Jung, Bellevue, WA (US); Jordin T. Kare, Seattle, WA (US); Nathan P. Myhrvold, Medina, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,304

(22) Filed: May 9, 2014

(65) Prior Publication Data

US 2014/0327324 A1 Nov. 6, 2014

Related U.S. Application Data

(63) Continuation of application No. 13/663,766, filed on Oct. 30, 2012, now Pat. No. 8,749,098, which is a continuation of application No. 13/367,195, filed on Feb. 6, 2012, now Pat. No. 8,581,446.

(51) Int. Cl.
*H02J 3/01* (2006.01)
*F02B 63/04* (2006.01)

(52) U.S. Cl.
CPC . *H02J 3/01* (2013.01); *F02B 63/04* (2013.01); *Y02E 40/40* (2013.01)

(58) Field of Classification Search
CPC .................................. H02J 3/01; Y02E 40/40
USPC ........................................................ 307/105
See application file for complete search history.

(56) References Cited

U.S. PATENT DOCUMENTS

| 2,132,044 A | 10/1938 | Overacker |
| 2,241,831 A | 5/1941 | Wahlquist |

(Continued)

OTHER PUBLICATIONS

McElligott, "Flywheels Set to Help Regulate Frequency on the U.S. Grid", TechSurveillance Magazine, Nov. 20, 2010 (7 pages).

(Continued)

*Primary Examiner* — Fritz M Fleming
(74) *Attorney, Agent, or Firm* — Foley & Lardner LLP

(57) ABSTRACT

An apparatus for removing harmonic noise from a power transmission line transmitting electricity at a primary frequency includes a filter and a controller coupled to the sensor and to an actuator-generator. The filter separates electricity at a harmonic of a primary frequency from the electrical signal transmitted by the power transmission line. The controller is configured to modulate consumption of electricity from the power transmission line. The consumption is controlled by electrical actuation of the actuator-generator, such that the electrical actuation of the actuator-generator causes consumption of electricity from the power transmission line at a harmonic of the primary frequency. The actuator-generator is coupled to an elastically deformable component, such that electrical actuation of the actuator-generator generates tension in the elastically deformable component.

33 Claims, 7 Drawing Sheets

(56) References Cited

U.S. PATENT DOCUMENTS

| | | | |
|---|---|---|---|
| 4,904,996 | A | 2/1990 | Fernandes |
| 5,567,994 | A | 10/1996 | Davis et al. |
| 5,655,617 | A | 8/1997 | Marshall |
| 6,215,316 | B1 | 4/2001 | Xu |
| 6,592,098 | B2 * | 7/2003 | Kao et al. ................. 251/129.01 |
| 6,612,402 | B1 | 9/2003 | Illingworth |
| 6,873,235 | B2 | 3/2005 | Fiske et al. |
| 7,124,918 | B2 * | 10/2006 | Rascoe ........................... 223/48 |
| 7,205,732 | B1 | 4/2007 | Gold |
| 7,692,331 | B2 | 4/2010 | Langlois et al. |
| 7,700,880 | B2 | 4/2010 | Varkey et al. |
| 8,456,028 | B1 | 6/2013 | Chan et al. |
| 2005/0007340 | A1 | 1/2005 | Kobayashi et al. |
| 2008/0129122 | A1 | 6/2008 | Yu et al. |
| 2008/0164701 | A1 | 7/2008 | Brown et al. |
| 2008/0164702 | A1 | 7/2008 | Brown et al. |
| 2008/0211315 | A1 | 9/2008 | Lowenstein |
| 2008/0305386 | A1 | 12/2008 | Havel et al. |
| 2009/0015022 | A1 | 1/2009 | Rome et al. |
| 2009/0152867 | A1 * | 6/2009 | Cripps ........................... 290/42 |
| 2009/0193808 | A1 | 8/2009 | Fiske |
| 2010/0005907 | A1 | 1/2010 | Kato et al. |
| 2010/0109473 | A1 | 5/2010 | Peterson |
| 2010/0117375 | A1 | 5/2010 | Kwok |
| 2010/0218495 | A1 | 9/2010 | Cowan |
| 2010/0237629 | A1 | 9/2010 | Gray |
| 2011/0003656 | A1 | 1/2011 | Bennett et al. |
| 2011/0007862 | A1 | 1/2011 | Schmidt et al. |
| 2011/0127777 | A1 * | 6/2011 | Fielder .......................... 290/1 E |
| 2011/0148202 | A1 | 6/2011 | Rada et al. |
| 2011/0175371 | A1 | 7/2011 | Gray |
| 2011/0234256 | A1 | 9/2011 | Fuse |
| 2011/0285147 | A1 | 11/2011 | Fyke et al. |
| 2011/0296823 | A1 | 12/2011 | McBride et al. |
| 2011/0304239 | A1 | 12/2011 | Eichhorm et al. |
| 2012/0313728 | A1 * | 12/2012 | Cairo, Jr. ...................... 333/174 |

OTHER PUBLICATIONS

PCT Application Search History; International App. No. PCT/US2013/024756; Search History: Limited Classification Search; date of search Mar. 18, 2013; 13 pages.

PCT International Search Report; Application No. PCT/US 13/24750; May 6, 2013; pp. 1-2.

PCT International Search Report; International App. No. PCT/US2013/024756; Apr. 11, 2013; pp. 1-2.

PCT International Search Report; International App.: PCT/US13/24863; May 20, 2013; pp. 1-2.

European Search Report; European App. No. EP 13 74 6305; bearing a date of Oct. 29, 2015 (received by our Agent on Nov. 2, 2015); 1 page.

\* cited by examiner

METHOD AND APPARATUS FOR REMOVAL OF HARMONIC NOISE

CROSS REFERENCE TO RELATED APPLICATIONS

The present application claims a priority benefit, under 35 U.S.C. §120, as a continuation application of U.S. patent application Ser. No. 13/663,766, filed Oct. 30, 2012, and entitled "METHOD AND APPARATUS FOR REMOVAL OF HARMONIC NOISE, which claims a priority benefit, under 35 U.S.C. §120, to U.S. patent application Ser. No. 13/367,195 filed Feb. 6, 2012, and entitled "METHOD AND APPARATUS FOR REMOVAL OF HARMONIC NOISE," which applications are hereby incorporated herein by reference in their entireties.

The present application is related to U.S. application Ser. No. 13/366,774, titled "Method and Apparatus for Storing Energy," filed Feb. 6, 2012, which application is incorporated herein by reference in its entirety.

BACKGROUND

Power transmission lines generally have small amounts of harmonic noise (e.g., 120 Hz, 360 Hz). The harmonic noise, which occurs at multiples of the base frequency (for example multiples of 60 Hz) may result from a variety of activities including power transmission line switch operations, which may generate noise in a transmission that is on the order of 100 Hz or greater. Harmonic noise may also be introduced into the system by large end users.

Systems, such as flywheel systems, generally fail to correct noise on this order. Some implementations for removing harmonic noise include the use of noise filters locally installed by end users. While filtration systems may result in cleaner electrical power (power closer to a specified frequency), such systems generally attenuate the unwanted frequency in a manner that generates overall system losses and that reduce the overall power and efficiency of the delivered electrical energy.

SUMMARY

The inventors have appreciated that harmonic noise may be removed through fast response systems capable of converting energy produced at the non-conforming, and specifically harmonic frequencies, into potential energy and generating from that potential energy, electrical energy at a desired frequency.

In view of the foregoing, the present disclosure is directed to apparatuses and methods for removing harmonic noise from an electrical signal transmitted by a power transmission line, wherein the electrical signal includes electricity at a primary frequency.

In some exemplary inventive embodiments disclosed herein, the apparatus for removing harmonic noise from a power transmission line transmitting electricity at a primary frequency includes a filter configured to separate electricity at a harmonic of the primary frequency from the electricity transmitted by the power transmission line. The apparatus further includes a controller coupled to the filter and to an actuator. The controller modulates consumption of the electricity at the harmonic of the primary frequency from the power transmission line by electrically actuating the actuator, such that the electrical actuation of the actuator causes consumption of electrical energy at the harmonic of the primary frequency. The actuator is coupled to an elastically deformable component, such that electrical actuation of the actuator generates tension in the elastically deformable component.

In some embodiments, the filter may further be configured to pass the electricity at the primary frequency through the filter and back to the power transmission line. In some embodiments, the apparatus may include a sensor for measuring noise in the power transmission line, the noise characterized by a frequency distinct from the primary frequency.

In some embodiments, the actuator-generator includes at least one of an electro-hydraulic component, an electromechanical component, an electromagnetic, or an electro-fluidic component. In some embodiments, the actuator generator includes a piezoelectric component.

In some embodiments, the elastically deformable component is a cable. The actuator may be coupled to an end of the cable. The actuator may be coupled to the cable at a point on the cable disposed between a first end of the cable and a second end of the cable. The actuator may be coupled to the cable at a first end of the cable and a second end of the cable. The cable may be a non-rotating cable, a monolithic cable, a stranded cable, a straight stranded cable, or a twisted stranded cable. The cable may have a circular cross-section, a rectangular cross-section, or a ribbon-like cross-section. The cable may be composed of steel, an organic polymer, a synthetic polymer, such as Kevlar (poly-paraphenylene terephthalamide), or Zylon (poly-phenylene benzobisoxazole), or of a carbon fiber, such as carbon nanotubes. The cable may be configured in a plurality of folds and may include a plurality of bearings on which the cable configured in a plurality of folds is disposed. The apparatus may include one of a force, torsion, or moment bearing support. The cable may be a hanging cable and may be pre-tensioned. The cable may include weights coupled thereto.

In some embodiments, the actuator is coupled to the elastically deformable component, such that electrical actuation of the actuator-generator generates torsional tension in the elastically deformable component. In some embodiments, the actuator is coupled to the elastically deformable component, such that electrical actuation of the actuator generates linear tension to the elastically deformable component.

In various embodiments, apparatus for removing harmonic noise may include a housing in which at least a portion of the elastically deformable component and the actuator-generator are disposed.

In various embodiments, the actuator-generator includes a rotary motor and in some embodiments, the actuator includes a linear motor.

The actuator may be configured to maintain the tension applied to the elastically deformable component and may include at least one of a brake, a releasable ratchet, or a movable pin actuatable to maintain the tension generated in the elastically deformable component in the tensioned state.

In some embodiments, the apparatus may include a sensor coupled to at least one of the elastically deformable component or the actuator, the sensor configured to measure a force or torque applied by the actuator to generate the tension in the elastically deformable component. In some embodiments the apparatus may include a strain gauge coupled to the elastically deformable component for measuring strain, which may include linear or shear strain, in the elastically component.

The actuator is coupled to the elastically deformable component, such that electrical actuation of the actuator causes application of a transverse force to the elastically deformable component in accordance with various embodiments.

In various embodiments, the apparatus includes a generator coupled to the at least one elastically deformable component, such that mechanical actuation of the generator via a release of tension in the elastically deformable component, causes a generation of electricity by the actuator generator. In some embodiments the actuator and the generator are coupled. In some embodiments, the generator is further configured to generate electricity at the primary frequency. In some embodiments the generator is further configured to generate electricity at the harmonic frequency.

Other exemplary embodiments include providing an apparatus for removing harmonic noise from an electrical signal transmitted by a power transmission line, the electrical signal transmitting electricity at a primary frequency, include a filter sensor configured to separate electricity at a harmonic of the primary frequency from the electrical signal transmitted by the power transmission line. The apparatus also includes a controller coupled to the filter and to a power transducer, the controller configured to modulate consumption of electrical energy from the electrical signal, the consumption controlled by electrical actuation of the power transducer, such that electrical energy separated by the filter is consumed through the electrical actuation of the power transducer. The power transducer may be coupled to an elastically deformable component, such that electrical actuation of the power transducer generates tension in the elastically deformable component.

In yet other exemplary embodiments, the apparatus for removing harmonic noise from a power transmission line transmitting electricity at a primary frequency includes a filter configured to separate electricity at a harmonic of the primary frequency from the electricity transmitted by the power transmission line. The apparatus further includes a controller coupled to the filter and to an actuator-generator. The controller modulates consumption of the electricity from the power transmission line by electrically actuating the actuator-generator, such that the electrical actuation of the actuator-generator causes consumption of the separated electricity at the harmonic frequency of the primary frequency. The actuator-generator is coupled to an elastically deformable component, such that electrical actuation of the actuator-generator generates tension in the elastically deformable component.

Certain exemplary embodiments provide a method for removing harmonic noise from an electrical signal transmitted by a power transmission line, where the electrical signal transmits electricity at a primary frequency. The methods include separating, via a filter, electricity at a harmonic of the primary frequency from the electrical signal transmitted by the power transmission line. The methods further include modulating consumption of electrical energy from the electrical signal, the consumption controlled by electrical actuation of a motor coupled to an elastically deformable component, the consumption modulated such that the separated electrical energy at a harmonic of the primary frequency are consumed through the electrical actuation of the motor. The motor may be coupled to the elastically deformable component, such that electrically actuating the motor causes the motor to generated tension in the elastically deformable component.

The methods may further include actuating a generator coupled to the elastically deformable component via restoring force produced by the elastically deformable component during a release of at least part of the tension applied to the elastically deformable component, whereby electricity is generated.

In some embodiments, methods may include regulating the modulation and actuation of the electrical generator via a controller.

In some embodiments, the methods may include transmitting the electricity generated by the generator to the electrical signal transmitted by the power transmission line.

In various embodiments, the motor and the generator are coupled. The motor may include a drive shaft coupled to the generator in some embodiments.

In some embodiments, the harmonic may be at an interval of 60 Hz, 50 Hz, or 10 Hz.

Exemplary inventive embodiments also provide a computer program product. The computer program product includes computer readable code stored on a tangible storage medium. The computer readable code forms a computer program executable by a computer for removing harmonic noise from a power transmission line transmitting electricity at a primary frequency. The computer program includes computer code for a filter to separate electricity at a harmonic of the primary frequency from the electrical signal transmitted by the power transmission line. The computer program further includes computer code for causing modulation of consumption of electricity from the power transmission line, the consumption controlled by electrical actuation of a motor coupled to an elastically deformable component, the consumption modulated such that the separated electricity at a harmonic of the primary frequency is consumed through the electrical actuation of the motor. The motor may be coupled to the elastically deformable component, such that electrically actuating the actuator generator causes the motor to generate tension in the elastically deformable component.

BRIEF DESCRIPTION OF THE FIGURES

The skilled artisan will understand that the drawings primarily are for illustrative purposes and are not intended to limit the scope of the inventive subject matter described herein.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive apparatuses, methods, and systems for removing harmonic noise. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various inventive embodiments disclosed herein are directed generally to methods and apparatuses for removing harmonic noise from a power transmission line.

Figure 1:
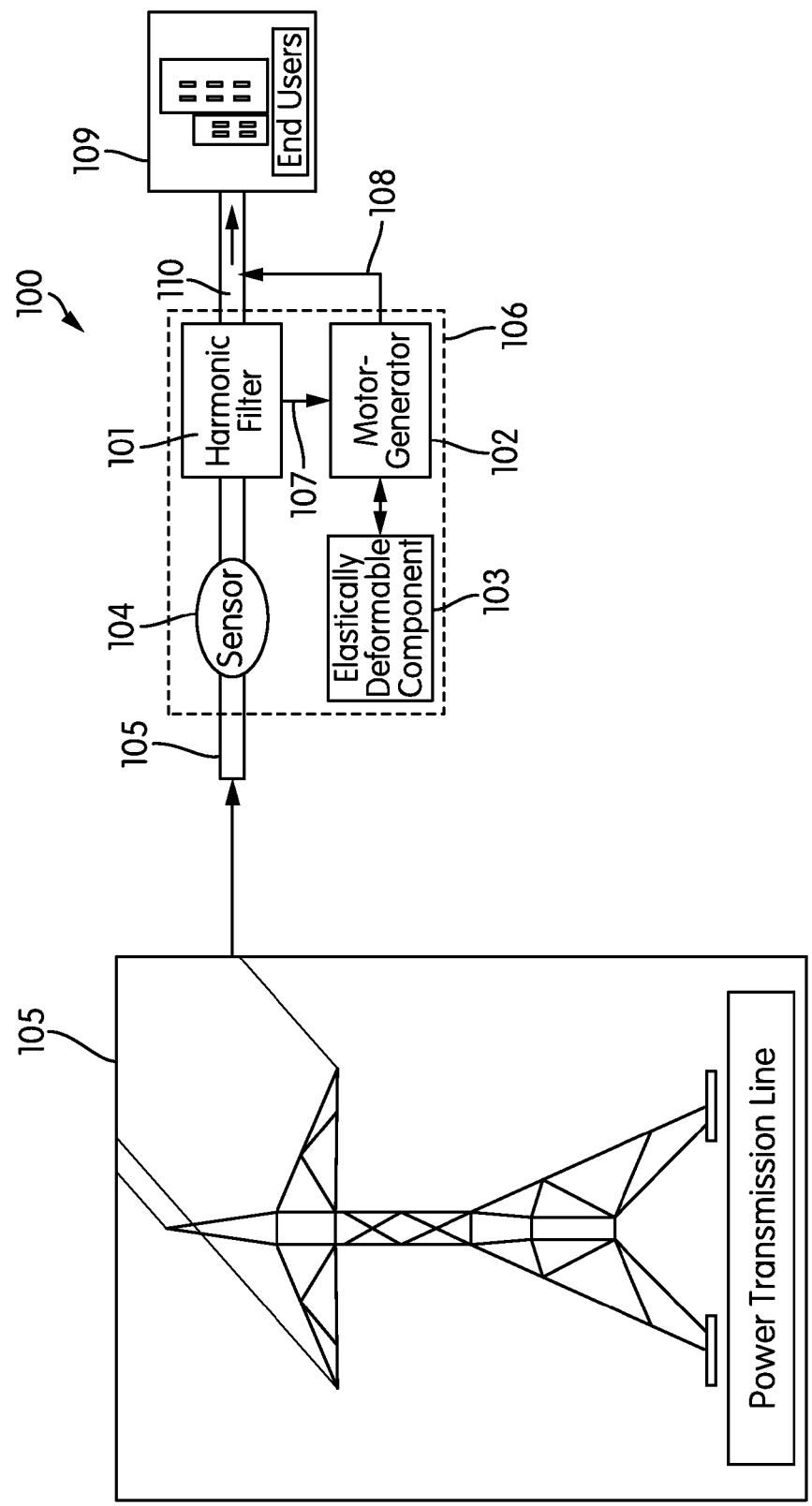
FIG. 1 illustrates an apparatus for removing harmonic noise from a power transmission line, in accordance with one embodiment.

FIG. 1 illustrates an apparatus for removing harmonic noise from a power transmission line, in accordance with one embodiment. Harmonic noise removal apparatus 100 includes a sensor 140 coupled to the power transmission line to characterize the frequencies transmitted by the power transmission line. In some embodiments, a second sensor may be disposed in the line for post-filtration characterization to determine the effectiveness of the filter or the quality of newly produced electrical energy. Harmonic noise removal apparatus 100 further includes a harmonic noise filter 101. The harmonic noise filter may include, but is not limited to, a low-pass filter, a high-pass filter, or a combination thereof, namely a band-pass filter. By way of example, the low-pass filter may allow frequencies substantially below 60 Hz to pass through and continue transmitting through the power transmission line. The filter may include multiple band-passes that specifically prevent harmonics of the primary or fundamental frequency from passing through and continuing transmitting frequencies 110 at or below 60 Hz, for example, through the power transmission line. The frequencies at the specified harmonic may be routed to motor-generator 102 where the power may be used to actuate the motor of motor-generator 102. The motor-generator may be configured specifically to operate at the specified frequencies (or within a range of frequencies) corresponding to the frequencies removed from the power transmission line.

The power 107 harvested from the power transmission line 105 and used to electrically actuate the motor of motor generator 102 may be stored as potential energy upon actuation of the motor-generator. Motor-generator 102 is coupled to elastically deformable component 103 to generate tension therein, which tension may be temporally maintained and released as required. In some embodiments, the generator of the motor-generator 102 may be configured to generate electrical energy at the primary frequency which energy may be re-introduced via transmission 108 to power transmission line 104 as "clean" power for consumption by end-users 109 operating at the primary frequency, for example 60 Hz. In some embodiments, the harmonic noise removal system may be disposed within a housing 106.

Figure 2:
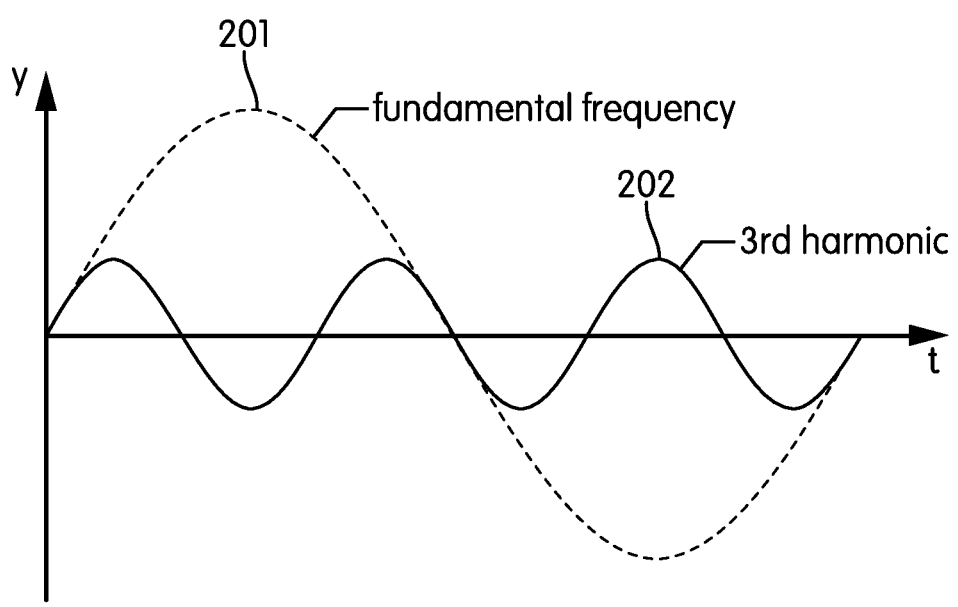
FIG. 2 provides an exemplary signal containing harmonic noise, which inventive embodiments may be implemented to remove.

FIG. 2 provides an exemplary signal containing harmonic noise, which various embodiments disclosed herein may be implemented to remove. The fundamental or primary frequency 201 represents the frequency that most end-users are consuming energy at and hence is the desired transmission frequency. Due to various anomalies in production and consumption, harmonic noise 202, which includes frequencies (here depicted as a $3^{rd}$ order harmonic) at a harmonic of the fundament frequency, may be introduced into the transmission of a power transmission line. The filtration system, in accordance with inventive embodiments, allows electricity at the primary frequency 202 pass through to the end users (109 in FIG. 1). The filter re-directs the higher ordered harmonic noise 202 for consumption by motor-generator 102, which may be used to store the energy as elastic potential energy through the application of tension to an elastically deformable component coupled to the motor-generator.

Figure 3:
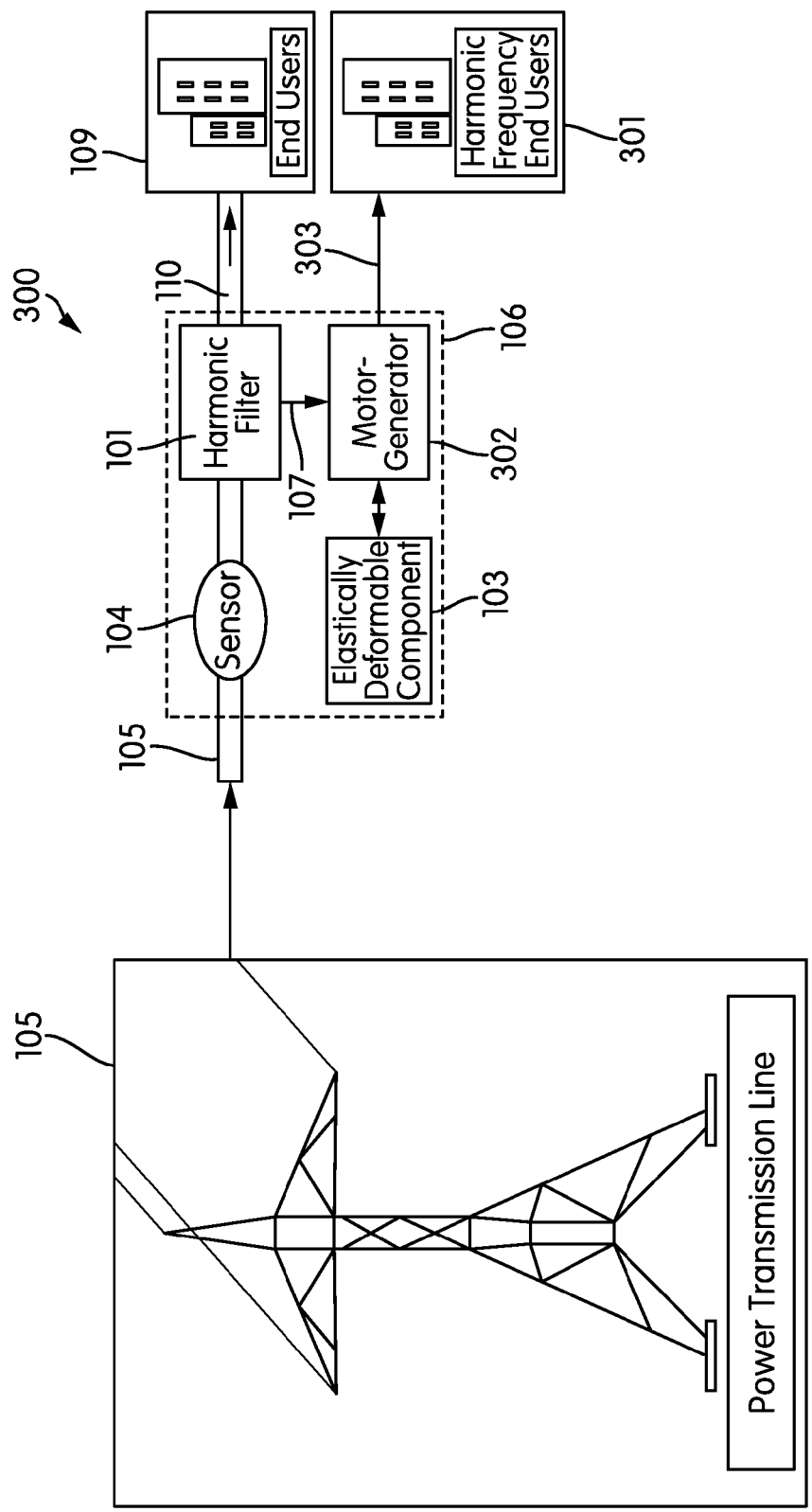
FIG. 3 illustrates an apparatus for removing harmonic noise from a power transmission line, in accordance with one embodiment.

FIG. 3 illustrates an apparatus for removing harmonic noise from a power transmission line, in accordance with one embodiment. Once the motor-generator stores energy in an elastically deformable component 103, through actuation of the motor by the harmonic noise 202, the energy may be re-released into the generator 102 to produce clean electricity at the primary frequency 201. Alternatively, as demonstrated in FIG. 3 the energy may be stored and subsequently used, via motor-generator 302 of apparatus 300 to generate electrical energy 303 at a harmonic frequency for use by harmonic-frequency end users 301.

Figure 4:
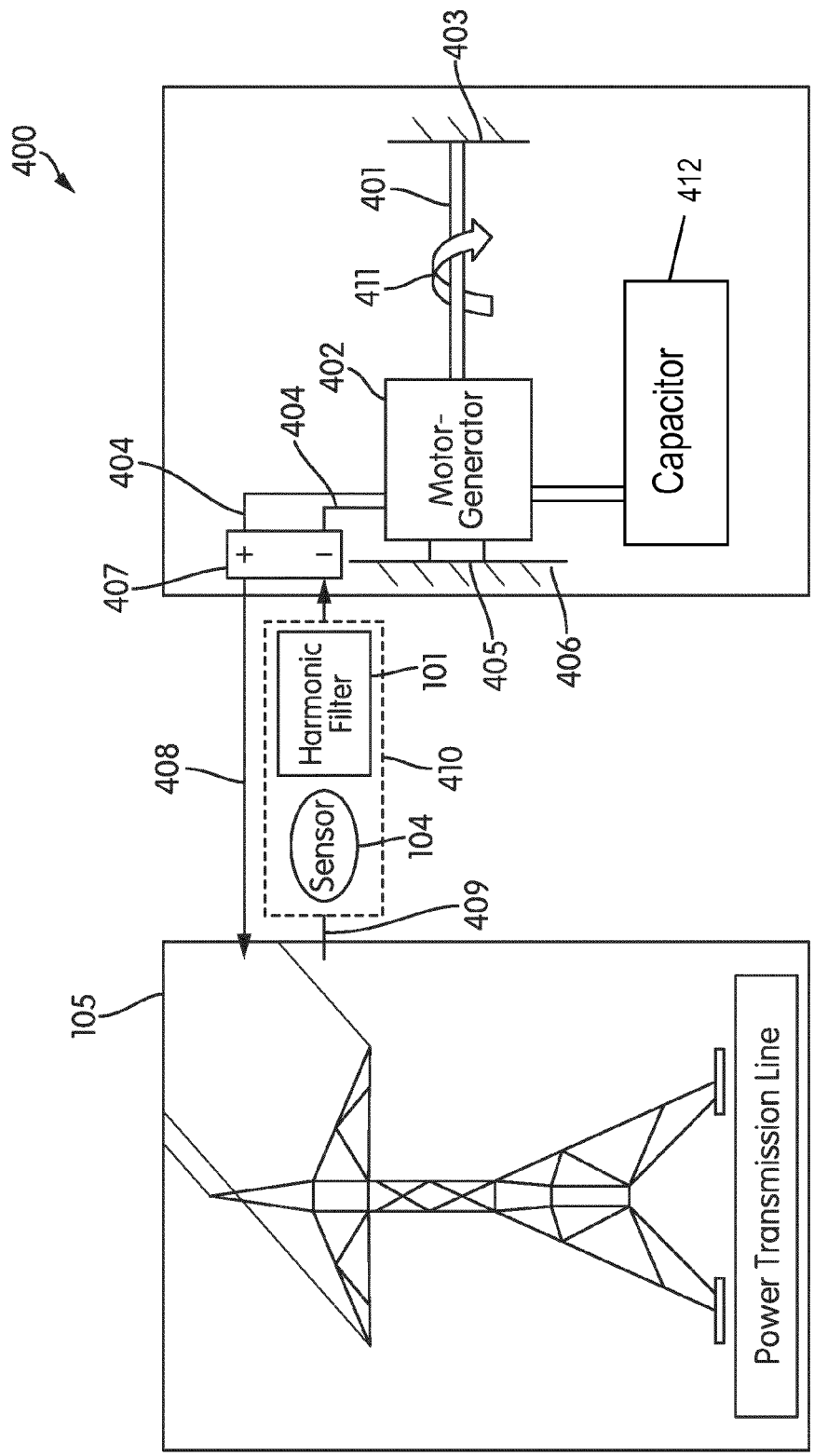
FIG. 4 illustrates a harmonic noise removal system having torsional energy storage and generation components, in accordance with one embodiment.
Figure 5:
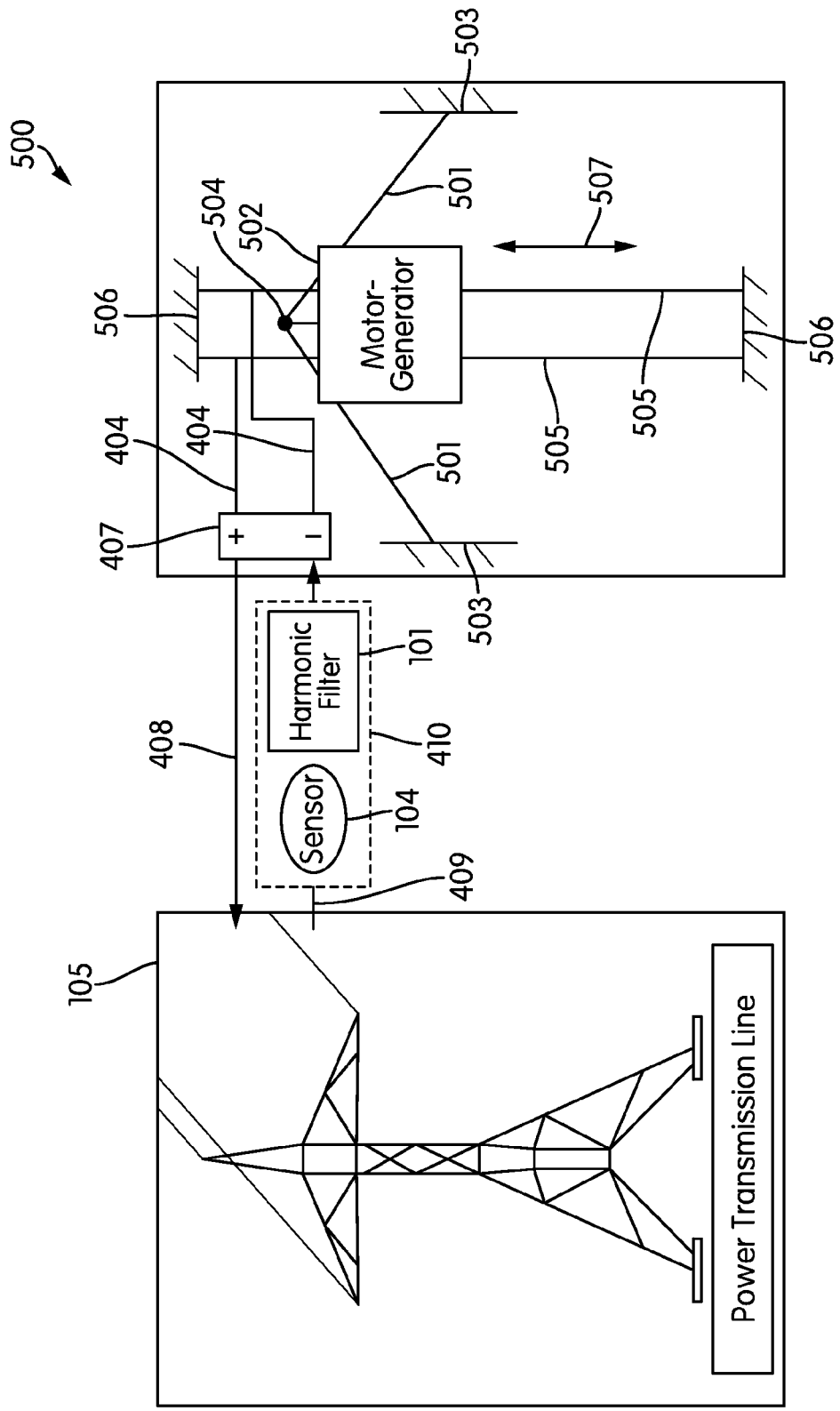
FIG. 5 shows a harmonic noise removal system having linearly actuated energy storage and generation components, in accordance with one embodiment.
Figure 6:
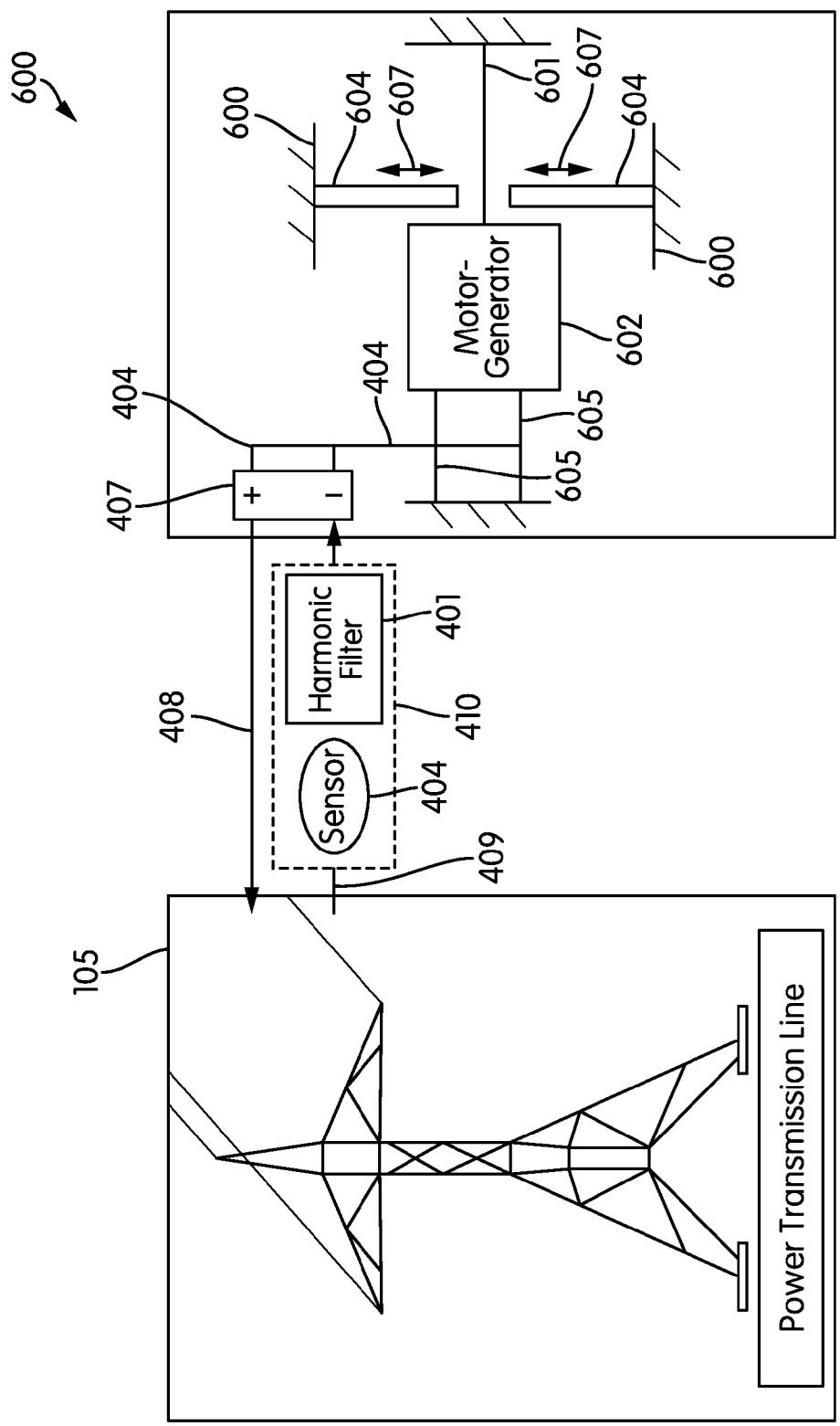
FIG. 6 shows a harmonic noise removal system having a linear actuator configured to translate along the axis of an energy storage component, in accordance with one embodiment.

FIGS. 4-6 demonstrate a range of energy storage and generation systems for implementation in various harmonic noise removal systems. As described above, the disclosed storage and generation systems may be used to generate electricity at the fundamental or primary frequency or a higher order frequencies such as at the harmonic frequencies to satisfy second and third order or higher frequency demand requirements by various users operating at frequencies distinct from the primary frequency transmitted on the grid.

FIG. 4 illustrates a harmonic noise removal system having torsional energy storage and generation components, in accordance with one embodiment. The torsional energy storage and generation components of apparatus 400 are connected to a power source in the form of a power transmission line 105. In the embodiment depicted in FIG. 4, the energy storage and generation apparatus 400 includes an elastically deformable component 401. Elastically deformable component 401 may be composed of a cable. The elastically deformable member is coupled to an actuator in the form of a combined motor-generator 402 in the depicted embodiment. Motor-generator 402 is a rotary actuator in the illustrated exemplary embodiment. In accordance with various inventive embodiments, elastically deformable member 401 may be coupled to a distinct motor or actuator and a distinct generator. Motor-generator 402 is coupled to component 401 for rotatably applying torsion tension (referenced by actuation direction 411) to component 401. Motor-generator is coupled to an extremity of component 401 in the illustrated embodiment. The extremity of component 401 opposing the extremity coupled to motor-actuator 402 is coupled to a stationary structure to assist in the twisting of the component 401 upon actuation of the end coupled to the motor-generator. As such, upon rotary actuation of the motor-generator 402, component 401 is twisted in opposition to a return force urging a return of the component to its untwisted configuration. The motor-generator is anchored via base 405 to a stationary structure 406 to maintain the motor in a stationary orientation when torsional tension is applied to component 401.

The motor-generator 402 is actuated via electrical energy transmitted from a power transmission line 105, specifically via filtered electrical energy at a harmonic frequency of the primary frequency. Motor-generator 402 may be specially adapted for operation at the harmonic frequency in various embodiments. In some embodiments, energy storage and generation apparatus 400, may be disposed in a housing coupled directly to a utility pole carrying the power transmission line and may be directly or indirectly coupled to the power transmission line. In embodiments where the motor-generator is indirectly coupled to the power transmission line, intermediate components such as transformers or rectifiers may be disposed between the power transmission line 105 and the motor-generator 402.

The motor-generator 402 may be actuated for power regulation, for example when more power is being produced than is required. Particularly in response to a decrease in demand or an increase in capacity, various embodiments described herein may be utilized as a mechanism for temporarily storing a portion of the excess energy through consumption by the motor-generator for elastically stretching component 401. Upon an increase in demand and a decrease in capacity, the stored energy may be rapidly released to provide a quick substitute for the energy generation capacity.

Motor-generator 402 generally includes two primary components, which include a rotor and a stator. Either the rotor or the stator may constitute the armature or the magnetic field. The magnetic field may be created via field coils, which may be powered via a portion of the electricity from the power transmission line. Electricity from the power transmission line may also provide an electric current to drive the magnetic field. The motor portion of the motor-generator may comprise an AC or a DC motor, including, but not limited to, multiphase, asynchronous and synchronous AC motors. In some embodiments, the motor may include a brake component to hold the twisted component 401 in the strained configuration. The brake may directly constrain the rotor of the motor in various embodiments. In other embodiments, as disclosed further herein, the brake may constrain component 401 and may include a system that is integral or separate from the motor-generator 402 and component 401.

Component 401 may be held in the twisted configuration for the required timeframe and released upon command. The control of the motor-generator 402 including actuation and release may be controlled via a controller. The controller may be a local controller or may include a remotely controlled system. At the appropriate command, the twisted component 401 may be released. The restoring force exerted by the release of the twisted component may be used to mechanically move the rotor of the motor-generator, such that motion of the magnetic field induces an electrical current to flow in the coils previously powered by power transmission line. The current induced by the mechanical motion of the rotor may be directed back towards the power transmission line and thereby inserted back into the power in the electrical grid.

With reference to FIG. 4, in various embodiments, a capacitor 412 may also be included to store energy that is in excess of what the tension in the wire may elastically hold. For example, if the power required to be shed from the grid to maintain the power transmission line operating at the right power level and frequency exceeds that storable by tension in component 402, at least a portion of the tension may be released to charge the capacitor 412 and the excess energy from the grid may be used to recharge and re-apply tension to component 402. The tension in the cable may be monitored, for example via a strain gauged or other sensor, for determining when the capacity of the elastically deformable component has been reached. Such a regime for sharing power between a device such as a capacitor 412 and the elastically deformable component 402, affords increased overall capacity of system 400. In some embodiments, power generated by the restoring force of tensioned component may be used to magnetize the field magnets. Power input into motor-generator 402 and power output from motor-generator 402 may be facilitated via connections 404, which may link to a central connection interface 407 coupled to power transmission line 105. As mentioned, electrical energy 409 may be transmitted to apparatus 400 from the power transmission line 105 and electrical energy 408 may be transmitted to the power transmission line 105 from apparatus 400.

A control system may be provided for controlling the consumption and generation of electrical energy by apparatus 400. The control system may be connected to a sensor for monitoring the frequency of the power transmitted in the power transmission line 105. The information received from the sensor may be used to initiate, increase, or decrease energy consumption as needed to maintain the power transmission line at a specific frequency. The control system may implement a computer program, which may be configured to control operation of a plurality of energy storage and generation apparatuses.

FIG. 5 shows a harmonic noise removal system having linearly actuated energy storage and generation components, in accordance with one inventive embodiment. The linearly actuated motor generator 502 translates in a direction transverse to the axis of an energy storage component, according to one inventive embodiment. Motor-generator 502, which may simply include a motor in some embodiments having a separate generator, actuates linearly. As demonstrated in FIG. 5, linearly actuating motor 502 via electrical energy transmitted from power transmission line 105 causes the motor (or at least a portion thereof) to move in a direction that traverses the axis of elastically deformable component 501, as indicated by arrow 507. Because component 501 is coupled to motor-generator 502 via coupler 504, which may permit rotation, as motor 502 is actuated component 501 is stretched laterally and the tension in component 501 is thereby increased. Accordingly, a restoring force is acting on component 501, which is anchored at anchors 503, which force is proportionate to the lateral displacement of a portion of component 501 from its neutral location. As further demonstrated, motor-generator 502 may be disposed on tracks 505, rigidly coupled to support structures 506. Tracks 505 maintain properly alignment of motor generator 502. Furthermore, because of the linear and possibly reciprocating motion that may be exerted on motor-generator 502, tracks 505 may include coils within which electrical current may be induced for the generation of electricity as a magnetic field in motor-generator 502 passes the coils via the exertion from the restoring force of stretched component 501. The input current for electrically actuating motor-generator 502 to displace the motor-generator and tension component 501 may be input through coils in tracks 505. Inputting and inducing current into coils 505 may be advantageous over inputting current into motor-generator and creating a magnetic field at tracks 505 in some implementations, as this allows the primary coils and hence the wires connected thereto to remain stationary.

FIG. 6 shows a harmonic noise removal system having a linear actuator that translates along the axis of an energy storage component in accordance with one embodiment. Motor-generator 602 of apparatus 600, which may simply include a motor in some embodiments having a separate generator, also actuates linearly. However, in contrast to the embodiment demonstrated in FIG. 5, the embodiment shown in FIG. 6, when linearly actuated via electrical energy transmitted from power transmission line 105 causes the motor (or at least a portion thereof) to move in a direction along or parallel to the axis of elastically deformable component 601 as indicated by arrow 607. FIG. 6 further demonstrates independent braking components 604. Brake 604 may be actuated to exert inward and oppositely opposed forces on component 601. This clamping force may be applied after extension to maintain the potential energy in stretched component 601, without requiring the motor and bearing components therein to sustain high axial forces applied by the restoring force of the tensioned component 601 on the motor or bearing contained therein. As described in connection with FIG. 5, motor-generator 602 may be disposed on one or more tracks 605, which tracks may include coils within which electrical current may be induced for the generation of electricity as a magnetic field in motor-generator 602 passes the coils via the exertion from the restoring force of stretched component 601.

The input current for electrically actuating motor-generator 602 to displace the motor-generator and tension component 601 may be input through coils in tracks 605.

Figure 7:
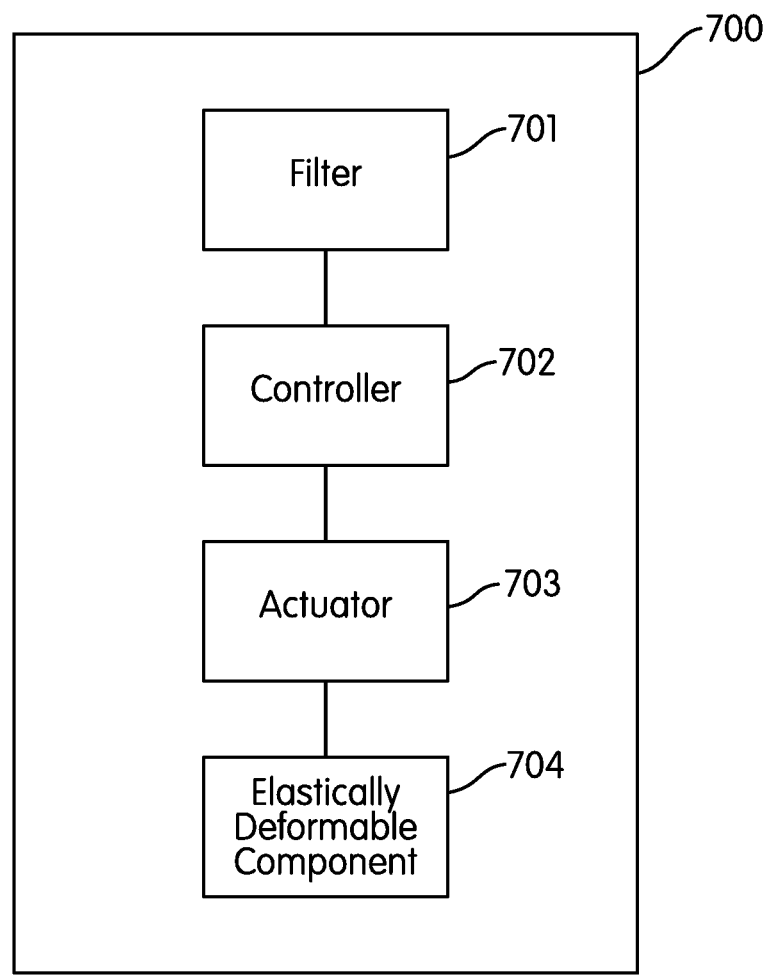
FIG. 7 illustrates a block diagram of a harmonic noise removal apparatus, in accordance with an exemplary embodiment.

FIG. 7 illustrates a block diagram of a harmonic noise removal apparatus, in accordance with one embodiment. The harmonic noise removal apparatus 700 is configured to remove harmonic noise from an electrical signal transmitted by a power transmission line, where the electrical signal transmits electricity at a primary frequency. Apparatus 700 includes a filter 701 configured to separate electricity at a harmonic of the primary frequency from the electrical signal transmitted by the power transmission line. Apparatus 700 also includes a controller 702 coupled to filter 701. Controller 702 is also coupled to actuator 703. Controller 702 is configured to control consumption by actuator 703, of electricity at the harmonic of the primary frequency obtained from filter 701 by electrical actuation of actuator 703. Actuator 703 is coupled to elastically deformable component 704, such that electrical actuation of the actuator by controller 702 causes actuator 703 to generate tension in the elastically deformable component 704.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An apparatus for removing harmonic noise from an electrical signal transmitted by a power transmission line, the electrical signal transmitting electricity at a primary frequency, the apparatus comprising:
   a filter configured to separate electricity into a first separated electrical signal from a predetermined frequency band around the primary frequency, from the electrical signal transmitted by the power transmission line; and
   a controller coupled to the filter and to an actuator, the controller configured to control consumption of the first separated electrical signal, the consumption controlled by electrical actuation of the actuator, such that electrical energy from the first separated electrical signal is consumed through the electrical actuation of the actuator,
   wherein the actuator is coupled to an elastically deformable component and a capacitor, such that electrical actuation of the actuator generates tension in the elastically deformable component and energy in excess of an energy storage capacity of the elastically deformable component is stored in the capacitor.

2. The apparatus of claim 1, wherein the filter is configured to pass the electricity at the primary frequency through the filter and back to the power transmission line.

3. The apparatus of claim 1, further comprising a sensor for measuring noise in the power transmission line, the noise characterized by a frequency distinct from the primary frequency.

4. The apparatus of claim 1, wherein the actuator includes at least one of an electro-hydraulic component, an electromechanical component, an electromagnetic component, or an electro-fluidic component.

5. The apparatus of claim 1, wherein the actuator includes a piezoelectric component.

6. The apparatus of claim 1, wherein the actuator is coupled to the elastically deformable component, such that electrical actuation of the actuator generates torsional tension in the elastically deformable component.

7. The apparatus of claim 1, wherein the actuator is coupled to the elastically deformable component, such that electrical actuation of the actuator generates linear tension in the elastically deformable component.

8. The apparatus of claim 1, further comprising a housing in which at least a portion of the elastically deformable component and the actuator are disposed.

9. The apparatus of claim 1, wherein the actuator includes a rotary motor.

10. The apparatus of claim 1, wherein the actuator includes a linear motor.

11. The apparatus of claim 1, wherein the actuator is further configured to maintain the tension generated in the elastically deformable component.

12. The apparatus of claim 1, wherein the actuator includes at least one of a brake, a releasable ratchet, or a movable pin actuatable to maintain the tension generated in the elastically deformable component.

13. The apparatus of claim 1, further comprising a sensor coupled to at least one of the elastically deformable component or the actuator, the at least one sensor configured to measure a force applied by the actuator to generate the tension in the elastically deformable component.

14. The apparatus of claim 1, further comprising a sensor coupled to at least one of the elastically deformable component or the actuator, the at least one sensor configured to measure a torque applied by the actuator to induce the tension in the elastically deformable component.

15. The apparatus of claim 1, further comprising at least one sensor coupled to at least one of the elastically deformable component or the actuator, the at least one sensor configured to measure stress in the elastically deformable component.

16. The apparatus of claim 1, further comprising a strain gauge coupled to the elastically deformable component for measuring strain in the elastically component.

17. The apparatus of claim 1, further comprising a strain gauge coupled to the elastically deformable component for measuring linear strain in the elastically deformable component.

18. The apparatus of claim 1, further comprising a strain gauge coupled to the elastically deformable component for measuring shear strain in the elastically deformable component.

19. The apparatus of claim 1, wherein the actuator is coupled to the elastically deformable component, such that electrical actuation of the actuator causes application of a transverse force to the elastically deformable component.

20. The apparatus of claim 1, further comprising a generator coupled to the at least one elastically deformable component, such that mechanical actuation of the generator via a release of tension in the elastically deformable component, causes a generation of electricity by the generator.

21. The apparatus of claim 20, wherein the actuator and the generator are coupled.

22. The apparatus of claim 20, wherein the generator is configured to generate electricity at the primary frequency.

23. The apparatus of claim 20, wherein the generator is configured to generate electricity at a harmonic frequency.

24. An apparatus for removing harmonic noise from an electrical signal transmitted by a power transmission line, the electrical signal transmitting electricity at a primary frequency, the apparatus comprising:
    a filter configured to separate electricity into a first separated electrical signal from a predetermined frequency band around the primary frequency, from the electrical signal transmitted by the power transmission line; and
    a controller coupled to the filter and to a power transducer, the controller configured to control consumption of the first separated electrical signal, the consumption controlled by electrical actuation of the power transducer, such that electrical energy from the first separated electrical signal is consumed through the electrical actuation of the power transducer,
    wherein the power transducer is coupled to an elastically deformable component, such that electrical actuation of the power transducer generates tension in the elastically deformable component, wherein the elastically deformable component is a cable.

25. The apparatus of claim 24, wherein the filter is configured to pass the electricity at the primary frequency through the filter and back to the power transmission line.

26. The apparatus of claim 24, further comprising a sensor for measuring noise in the power transmission line, the noise characterized by a frequency distinct from the primary frequency.

27. The apparatus of claim 24, wherein the power transducer includes at least one of an electro-hydraulic component, an electromechanical component, an electromagnetic component, or an electro-fluidic component.

28. The apparatus of claim 24, wherein the power transducer includes a piezoelectric component.

29. The apparatus of claim 24, wherein the power transducer is coupled to the elastically deformable component, such that electrical actuation of the power transducer generates torsional tension in the elastically deformable component.

30. The apparatus of claim 24, wherein the power transducer is coupled to the elastically deformable component, such that electrical actuation of the power transducer generates linear tension in the elastically deformable component.

31. The apparatus of claim 24, further comprising a housing in which at least a portion of the elastically deformable component and the power transducer are disposed.

32. The apparatus of claim 24, wherein the power transducer is further configured to maintain the tension generated in the elastically deformable component.

33. An apparatus for removing harmonic noise from a power transmission line transmitting electricity at a primary frequency, the apparatus comprising:
    a filter configured to separate electricity into a first separated electrical signal from a predetermined frequency band around the primary frequency, from the electricity transmitted by the power transmission line; and
    a controller coupled to the filter and to an actuator-generator, the controller configured to control consumption of the electricity, the consumption controlled by electrical actuation of the actuator-generator, such that the electrical actuation of the actuator-generator causes consumption of the first separated electrical signal, wherein the actuator-generator is coupled to an elastically deformable component and a capacitor, such that electrical actuation of the actuator-generator causes an application of tension to the elastically deformable component and energy in excess of an energy storage capacity of the elastically deformable component is stored in the capacitor.

\* \* \* \* \*